Sept. 3, 1940.  A. C. ROBERTSON  2,213,744
SPLICING APPARATUS
Filed May 24, 1938
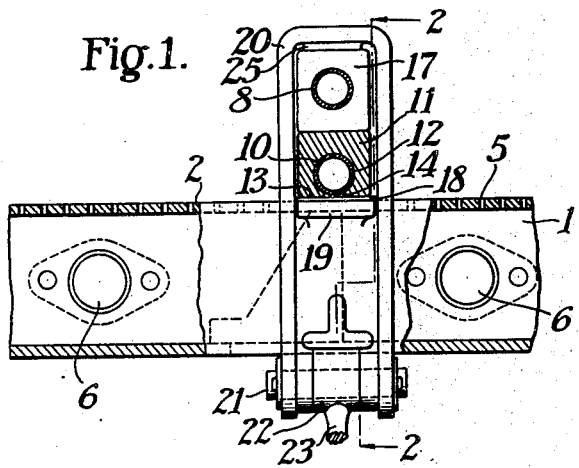
Fig. 1.
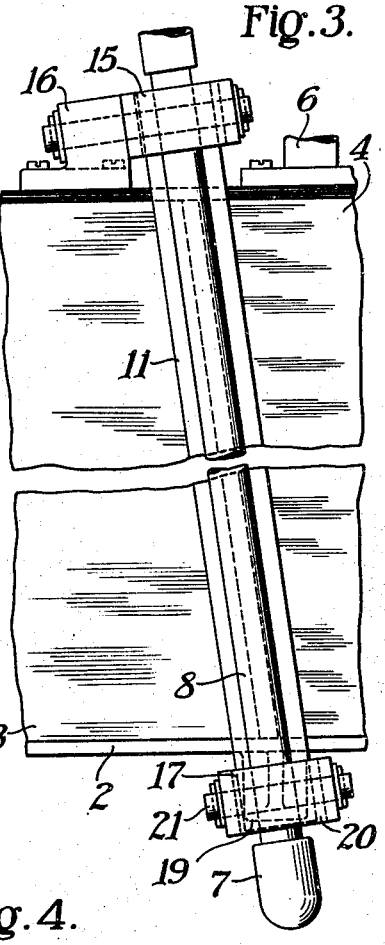
Fig. 3.
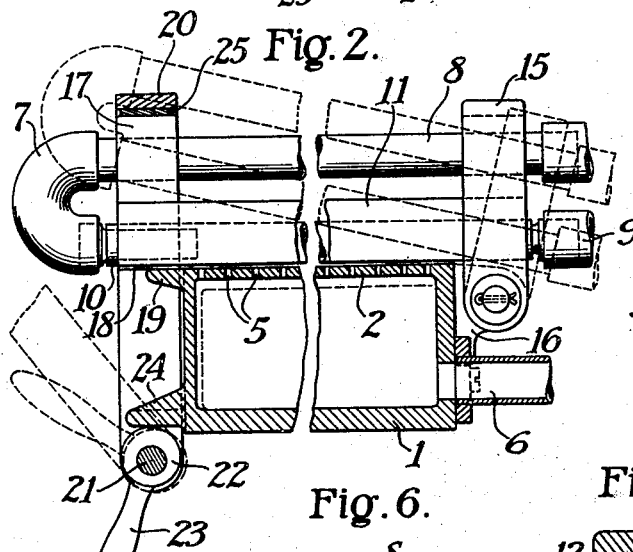
Fig. 2.
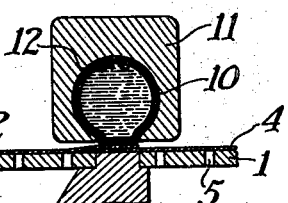
Fig. 4.
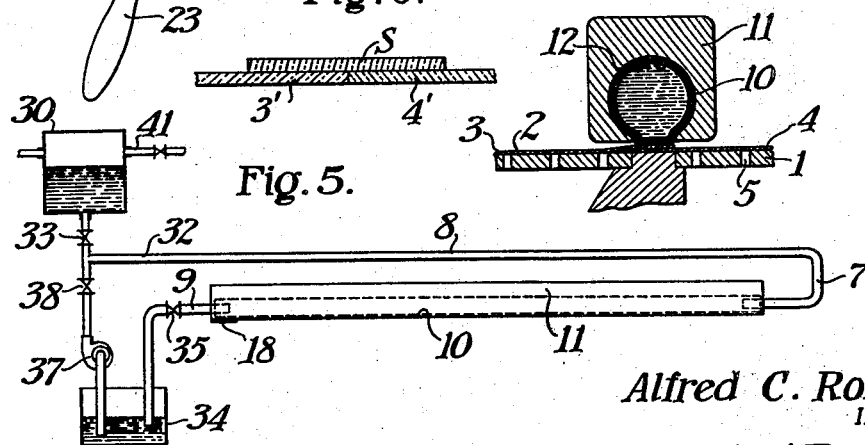
Fig. 6.
Fig. 5.
Alfred C. Robertson
INVENTOR
BY
ATTORNEYS Patented Sept. 3, 1940

2,213,744

UNITED STATES PATENT OFFICE 2,213,744

SPLICING APPARATUS

Alfred Crawford Robertson, Rochester, N. Y., assignor to Eastman Kodak Company, Rochester, N. Y., a corporation of New Jersey Application May 24, 1938, Serial No. 209,683

9 Claims. (Cl. 154—42)

The present invention relates to an apparatus for splicing the ends of two webs of material together to form one continuous web, and particularly to an apparatus wherewith a forceful and even pressure can be rapidly applied to the spliced joint regardless of the width of the web.

The operations necessary for splicing the ends of two webs of material together generally includes, squaring or trimming the ends of the web, applying an adhesive to one end of one of the webs, bringing the ends into a proper end to end relation, and then applying pressure to the ends of the webs until the adhesive has set. The application of pressure in known splicing apparatus is usually effected by bringing a rigid member down upon the ends of the webs and applying pressure to said rigid member so that it acts much in the manner of an iron in pressing. The application of pressure in this manner is satisfactory so long as the webs being spliced are fairly narrow. However, the use of a rigid pressure member is not satisfactory where the webs to be joined are fairly wide, because it is difficult to apply uniform pressure to a fairly long rigid member, and a rigid member will not flex sufficiently to allow for irregularities in the thickness of the webs which are to be spliced, as the result of which an even pressure is not transmitted throughout the length of the splice. For instance, should a web vary in thickness between a plurality of points across its width, a rigid pressure member would rest on the high portions but would not flex enough to apply the same pressure to the lower or thinner parts of the web.

In many arts, such as paper making, fabrication of cellulose sheeting, and the like, it is not unusual to make the webs of material in widths up to 60 inches. In these arts the sheets may be formed in varying lengths and be spliced together to form a continuous sheet going onto a take-up roll. In splicing webs of this width it has proven difficult to apply a uniform pressure to the spliced joints. Also in instances such as those pointed out it is imperative that the splice be made with rapidity so that the take-up capacity needed at the time of splicing can be reduced to a minimum. It is, therefore, for solving the problem of rapidly and efficiently splicing wide webs of material that the present invention was conceived.

One object of the present invention is to provide a splicing apparatus wherewith pressure is applied to the ends of the webs to be joined by the expansion of a flexible member so that a uniform pressure will be obtained across a splice of any width, and regardless of the irregularities in the thickness of the webs. Another object is to have the flexible member take the form of an elastic or expansive tube into which a fluid can be forced under pressure to expand the same to give a rapid and uniform pressure throughout the length of the splice. A further object is to expand the tube by means of hot water so that heat and pressure can be applied to the spliced joint simultaneously, the heat serving to speed up the setting of the adhesive. And yet another object is to provide a device of the form described wherein expansion of the rubber tube is controlled by a slotted rigid tubular member surrounding the same so that the tube can only expand in one locality and in one direction, that being adjacent the ends of the web and toward the same to press them onto a support. Another object is to provide an apparatus of the type described wherein the webs are adapted to be held in splicing relation on the support by means of a suction so that they will be in proper splicing position when the pressure member is brought down upon the joint. And yet another object is to provide a splicing apparatus of the type described which is simple and efficient in operation, as well as cheap to manufacture.

Briefly, my invention comprises a support on the top of which the ends of two webs to be spliced are positioned in relative splicing position after being properly prepared. The pressure member, which includes a rubber tube encased in a slotted rigid member, is then brought down on the ends of the web so that the slot in the rigid member is adjacent the ends of the webs. After the pressure member is clamped in position, a fluid under pressure, preferably hot water, is then introduced into the rubber tube causing it to expand through the slot in the rigid member to simultaneously apply heat and pressure to the ends of the webs.

The novel features that I consider characteristic of my invention are set forth with particularity in the appended claims. The invention itself, however, both as to its organization and its method of operation, together with addittional objects and advantages thereof, will best be understood from the following description of a specific embodiment when read in connection with the accompanying drawing in which, Fig. 1 is a partial side elevation, partly in section, of a preferred embodiment of my splicing apparatus, showing the pressure element clamped in its operative position relative to the top of the support, and with the rubber tube deflated, Fig. 2 is a transverse section of the apparatus taken on line 2—2 of Fig. 1, Fig. 3 is a partial plan view of the apparatus showing webs on the support with their overlapped ends under the pressure member, Fig. 4 is an enlarged sectional detail of the pressure member in clamping position relative to the overlapped ends of the two webs on the support, and showing the manner in which the tube is expanded to press upon said overlapped ends of the webs, Fig. 5 is a diagrammatic showing of one piping arrangement which could be used for forcing the fluid into the rubber tube under pressure, and Fig. 6 is a sectional detail showing the ends of the webs joined in abutment and held by a separate adhesive strip instead of in the conventional overlapped manner.

Like reference characters refer to corresponding parts throughout the drawing.

Referring now to the drawing my splicing apparatus includes a support 1 on the flat top 2 of which are placed in overlapped relation, see Fig. 4, the prepared ends of webs 3 and 4. When referring to the ends of the webs as being prepared, I mean that they have each been previously properly trimmed and an adhesive has been applied to one or both thereof. While I have chosen to show the apparatus arranged for effecting a diagonal splice, a diagonal splice generally being considered stronger than a square splice, it will be appreciated that the apparatus could be arranged to handle a square splice without necessitating any change except in the location of the pressure element relative to the top of the support. One of the webs 3 or 4 could be coming from any source of supply, while the other web could be taken up on a take-up roll in the form of a long continuous strip, but since the origin of one strip and the destination of spliced strip is of no consequence in the operation of my splicing device, the supply and take-ups for the webs are not shown.

As shown, for the purpose of holding the webs 3 and 4 on the top of the support in end to end splicing relation, the support may take the form of a chamber which is air tight with the exception of holes 5 extending through the top thereof. One side wall of the support may be provided with hose connections 6 to which an evacuating pump of any well-known form may be attached for evacuating air from the interior of said support whereby the webs are held in place on the top of the support by suction. However, it will be readily understood that although I have shown the webs held on the support by suction, any other suitable means may be used for performing this function without going beyond the scope of the present invention.

The pressure element of the splicing apparatus may comprise a U-shaped conduit 7 one branch 8 of which is connected with a supply of fluid under pressure, and the other branch 9 of which is connected to a discharge. The branch 8 of the conduit 7 is made from a rigid or metal pipe while the branch 9 thereof, which constitutes the pressure member proper, is made from a tube capable of expansion, for example, a rubber tubing. The pressure member proper includes an expansive tube 10 which may be rubber, which passes through an elongated rigid tubular member 11 the bore 12 of which is substantially the same diameter as that of the expansive tube 10, see Fig. 1. This rigid tubular member is of such a length as to extend completely across the top of the support 1, and overhang the side walls thereof by a slight amount, and the wall 13 thereof is provided with a slot 14 extending throughout the length of the member. The width of the slot 14 is less than the diameter of the bore 12 so that the rubber tube 10 normally has no tendency to protrude or fall through the same.

The U-shaped conduit 7 extends through and is fixed to move with the U-shaped strap 15 which in turn is pivoted to the offset bracket 16 fixed to one side of the support 1. For connecting the conduit to this strap to move therewith, the strap may be fixed to the sides of the rigid tubular member 11, and an apertured block, not shown, surrounding the intake end of the branch 8 of the conduit, similar to the one indicated at 17, shown surrounding the other end of the branch 8, the purpose of which will be described hereinafter. The conduit is so pivoted to the support that the same can be raised away from the top thereof, as indicated in dotted line, Fig. 2, to permit the webs to be placed on the support in an end to end splicing relation, and can be lowered to its clamping position where the branch 9 of the conduit is horizontal with the top of the support with the slot 14 in the rigid tubular member 11 adjacent the overlapped ends of the webs, see Fig. 4.

When the pressure element is lowered to its operative position on the top of the support the bottom wall of the rigid tubular member 11 may directly contact the surface of the webs thereon. However, if the webs have a surface which it is desirable not to scratch or mark, it is necessary to have the rigid tubular member slightly spaced from the surface of the web, allowing the pressure to be applied to the overlapping ends of the webs by that portion of the rubber tube extending through the slot 14 when fluid under pressure is forced into the tube, see Figs. 1 and 4. This spacing of the rigid tubular member from the top of the support can be accomplished in any suitable manner, and for the purpose of illustration I have shown the bottom surface of the member adjacent the left hand end thereof, looking at Fig. 2, provided with a shoulder 18 which is adapted to engage an extension 19 on the left-hand side of the support for spacing that portion of the tubular member over the support from the top thereof. The other end of the tubular member 11 will need no such spacing shoulder, because it can be fixed in the U-strap 15 so that it will be properly spaced from the top of the support when pivoted to its operative position.

For clamping the pressure element in its operative position relative to the top of the support I have shown a U-clamp 20 which is pivoted on the stud 21 located at one side of the support, said stud 21 being capable of a limited vertical movement for drawing the clamp downward. Rotatably mounted on the stud 21 between the arms of the clamp is an eccentric 22 having an integral handle 23. This eccentric when rotated to its operative position, see full line position Fig. 2, acts against the projection 24 of the support to draw the stud 21 and the clamp downward to their clamping position, while in its inoperative position dotted line Fig. 2, the stud 21 and the clamp 20 are raised vertically so that the clamp can be swung over the end of the conduit 7 to release the same. To provide a bearing for the upper end of the clamp, the branch 8 of the conduit is encased by the apertured block 17 which rests on the top of the rigid tubular member 11. A shim 25 may be fixed to the top of the block 17 or to the under side of the cross arm of the clamp.

After the pressure element is clamped in its operative position relative to the top of the support, it will be understood that, if discharge through the end of the rubber tubing is prevented and fluid is forced into said tube under pressure, the tube will tend to expand. Since the tube is entirely encased by the rigid member 11 with the exception of that portion opposite the slot 14 therein, the tube will expand through said slot, as shown in Fig. 4, to press the overlapped ends of the webs onto the top of the support. Although either air or liquid could be used for expanding the rubber tube 10, it may be desired to apply heat to the joint simultaneously with pressure in which case a hot liquid, such as hot water, will serve as an efficient expanding medium.

Although many different forms of piping arrangements could be used satisfactorily to cause an expansion of the tube 10, I have shown diagrammatically in Fig. 5 an arrangement which permits the simultaneous application of heat and pressure to the overlapping ends of the webs by use of hot water as the expanding fluid. For obtaining water under pressure a storage tank 30 is provided into which and above the surface of the water therein is conducted compressed air through pipe 41. This storage tank 30 is connected with the intake branch 8 of the conduit 7 by a pipe 32 in which is situated a valve 33. The branch 9, or the rubber tube 10, of the conduit discharges into the sump 34 and this discharge is controlled by a valve 35. The water is recirculated from the sump 34 by the pump 37 to the intake branch 8 of the conduit 7, and a valve 38 is located between the pump and the branch 8. Water in the sump 34 and tank 30 can be heated and kept hot by any suitable heating element, not shown.

When no pressure is desired in the pressure member the valve 33 is closed and valves 35 and 38 are opened. This allows hot water to be circulated from the sump through the conduit to maintain the rubber tube 10 warm or hot. Now when it is desirable to apply pressure to the splice, the conduit or pressure element is brought down upon the top of the support and clamped in position. The valve 35 is then first closed. And when the conduit is full of water from the sump the valve 38 is closed. Now by opening the valve 33 pressure is applied to the liquid in the conduit causing the rubber tube 10 to expand through the slot in the rigid tubular member 11 to press the overlapped ends of the webs onto the top of the support. After the splice is pressed and completed, the valve 33 is closed and the valves 35 and 38 are again opened. Should the pressure on the supply water line be sufficient to give the desired expansion to the rubber tube and there be no need for conserving water, the sump and storage tank could be done away with, in which case there need only be a valve at the discharge end of the rubber tube and at the intake end of the branch 8 of the conduit.

While I have shown a particular structure for carrying out my invention it is pointed out that the invention is directed to the idea of applying pressure to a splice by expanding a flexible element by means of a fluid under pressure, and the invention is not limited to the details of the structure shown. For instance, the expansive pressure member need not be a rubber tube situated within a rigid tubular member as shown, but could take the form of a hollow element the walls of which would be rigid with the exception of an area adjacent the splice which could be flexible. Such an element could take the form of the rigid tubular member 11 by merely vulcanizing or otherwise attaching a flexible strip across the slot 14 therein, which would expand upon a fluid under pressure being forced into the bore 12 of the member 11. The conduit is only shown in the form of a U to illustrate one convenient manner for permitting the pressure element as a whole to be raised and lowered relative to the top of the support, it being understood that the piping between the element and the supply and discharge therefore could be made such as to permit a pivoting of the pressure element such as by use of swivel joints. However, it is to be understood that the pressure element could take the form of a single straight branch complementary to branch 9 including the flexible tube, and such a single branch could be raised vertically in parallel relation to the top of the support. Since the clamping arrangement used for holding the pressure element in its operative position relative to the top of the support will necessarily vary depending upon the manner of mounting the pressure element for movement relative to the table, the invention is not limited to the particular form of clamping arrangement shown and described. While I have described my device in connection with making splices in the form of overlapped joints, it will be readily appreciated that it is applicable to splices of the form shown in Fig. 6, where the ends of the webs 3' and 4' are abutted and held together by an adhesive strip S which overhangs the abutted ends of the webs.

From the above description it will be readily appreciated that my device allows a pressure to be applied quickly and evenly to a splice regardless of the length thereof or the irregularities of the surface of the webs to be spliced. In addition, it permits the application of heat simltaneously with the application of pressure, the heat serving to quickly set the adhesive and speed up the time necessary to make a firm splice.

Although I have shown and described a certain specific embodiment of my invention, I am fully aware that many modifications thereof are possible. My invention, therefore, is not to be restricted except in so far as is necessitated by the prior art and by the spirit of the appended claims.

Having thus described my invention, what I declare is new and desire to secure by Letters Patent of the United States is:

1. In an apparatus of the type described, the combination of a support upon which two webs of material are adapted to be positioned in end to end relation for splicing, an elongated rigid tubular member having a slot extending longitudinally of and through the wall thereof, said tubular member pivoted to one side of the support to move between an inoperative position wherein it is raised away from the support, and an operative position wherein it extends across the support so that the slot therein is adjacent and spaced from the ends of the webs on the support, an elongated expansive member situated within the tubular member, and means for forcing a fluid into said expansive member under pressure whereby the same is expanded through the slot in the rigid tubular member to apply pressure to the ends of the webs on the support.

2. In an apparatus of the type described, the combination of a support upon which two webs of material are adapted to be positioned in end to end relation for splicing, an elongated rigid tubular member having a slot extending longitudinally of and through the wall thereof, said tubular member pivoted to one side of the support to move between an inoperative position wherein it is raised away from the support, and an operative position wherein it extends across the support so that the slot therein is adjacent and spaced from the ends of the webs on the support, an elongated expansive member situated within the tubular member, means for holding the rigid tubular member in its operative position, and means for forcing a fluid into said expansive member under pressure whereby the same is expanded through the slot in the rigid tubular member to apply pressure to the ends of the webs on the support.

3. In an apparatus of the type described, the combination of a support upon which two webs of material are adapted to be positioned in end to end relation for splicing, an elongated rigid tubular member having a slot extending longitudinally of and through the wall thereof, said tubular member pivoted to one side of the support to move between an inoperative position wherein it is raised away from the support, and an operative position wherein it extends across the support so that the slot therein is adjacent and spaced from the ends of the webs on the support, an elongated expansive member situated within the tubular member, means for holding the rigid tubular member in its operative position, said means including a U shaped clamping member pivoted to the support and adapted in its operative position to overhang the free end of the rigid tubular member when the same is in its operative position, and means for drawing said clamping member down against the rigid tubular member to properly position and hold the latter relative to the support, and means for forcing a fluid into said expansive member under pressure whereby the same is expanded through the slot in the rigid tubular member to apply pressure to the end of the webs on the support.

4. In an apparatus of the type described, the combination of a support upon which two webs of material are adapted to be positioned in end to end relation for splicing, an elongated rigid tubular member having a slot extending longitudinally of and through the wall thereof, said tubular member pivoted to one side of the support to move between an inoperative position wherein it is raised away from the support, and an operative position wherein it extends across the support so that the slot therein is adjacent and spaced from the ends of the webs on the support, a rubber tubing situated within the tubular member, and means for forcing a fluid into said rubber tube under pressure whereby the same is expanded through the slot in the rigid tubular member to apply pressure to the ends of the webs on the support.

5. In an apparatus of the type described, the combination of a support on the top of which two webs of material are adapted to be positioned in end to end relation for splicing, means for holding said webs on the support, an elongated rigid tubular member having a slot extending longitudinally of and through the wall thereof, said tubular member pivoted to one side of the support to move between an inoperative position wherein it is raised away from the top of the support, and an operative position wherein it extends across the support so that the slot therein is adjacent the ends of the webs on the support, a rubber tube of substantially the same diameter as the bore of the rigid tubular member situated in said bore, and means for forcing hot water into said rubber tube under pressure, whereby the tube is expanded through the slot in the rigid tubular member to simultaneously apply heat and pressure to the ends of the webs on the support.

6. In an apparatus of the type described, the combination of a hollow support on the top of which two webs of material are adapted to be positioned in end to end relation for splicing, said support provided with one or more openings extending from the interior through the top thereof, means for evacuating the air from said support to create a vacuum therein for holding the webs of material on the top thereof, an elongated rigid tubular member having a slot extending longitudinally of and through the wall thereof, said tubular member pivoted to one side of the support to move between an inoperative position wherein it is raised away from the top of the support, and an operative position wherein it extends across the support so that the slot therein is adjacent the ends of the webs on the support, a rubber tube of substantially the same diameter as the bore of the rigid tubular member situated in said bore, and means for forcing hot water into said rubber tube under pressure whereby the tube is expanded through the slot in the rigid tubular member to simultaneously apply heat and pressure to the ends of the webs on the support.

7. In an apparatus of the type described, the combination with a support upon which two webs of material are adapted to be positioned in end to end relation for splicing, of a rigid hollow member having an elongated slot extending through the wall thereof, said member disposed relative to said support whereby the slot therein is adjacent and spaced from the ends of the webs on the support, a hollow expansive member situated within said rigid hollow member, and means for forcing a fluid into said expansive member under pressure whereby the same is expanded through said slot to apply pressure to the ends of the webs on the support.

8. In an apparatus of the type described, the combination with a support upon which two webs of material are adapted to be positioned in end to end relation for splicing, of a rigid tubular member having a slot extending through the wall thereof and extending longitudinally of said member, said tubular member disposed relative to the support whereby said slot therein is adjacent and spaced from the ends of the webs on the support, a tubular expansive member situated within said tubular member, and means for forcing a fluid into said expansive member under pressure whereby the same is expanded through said slot to apply pressure to the ends of the webs on the support.

9. In an apparatus of the type described, the combination with a support upon which two webs of material are adapted to be positioned in end to end relation for splicing, of a rigid hollow member having an elongated slot extending through the wall thereof, said member disposed relative to said support whereby the slot therein is adjacent and spaced from the ends of the webs on the support, a hollow expansive member situated within said rigid hollow member, and means for forcing a hot liquid into said hollow member under pressure whereby the same is expanded through said slot to simultaneously apply pressure and heat to the ends of the webs on the support.

ALFRED CRAWFORD ROBERTSON.